Jan. 5, 1954 — E. H. LEBEIS, JR — 2,665,258

BEAD FORMING PROCESS

Filed Sept. 29, 1950 — 2 Sheets-Sheet 1

INVENTOR
Edward H. Lebeis, Jr.
BY
B. Max Klevit
ATTORNEY

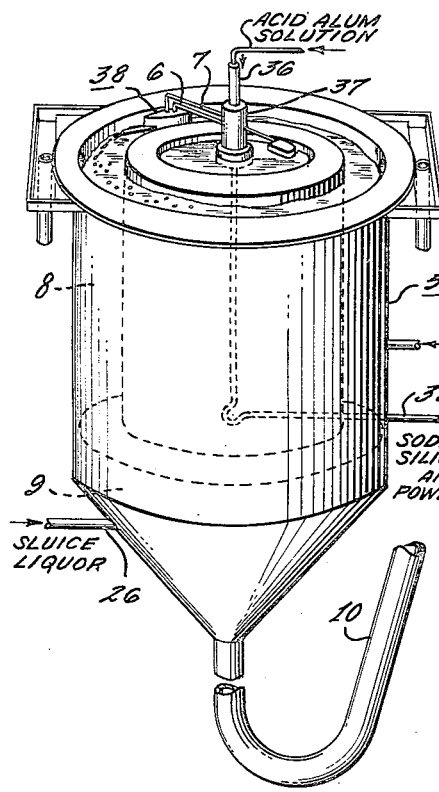
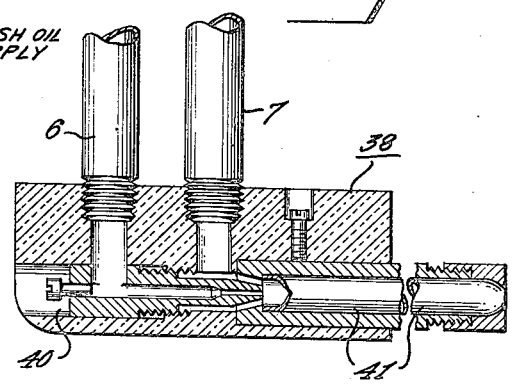
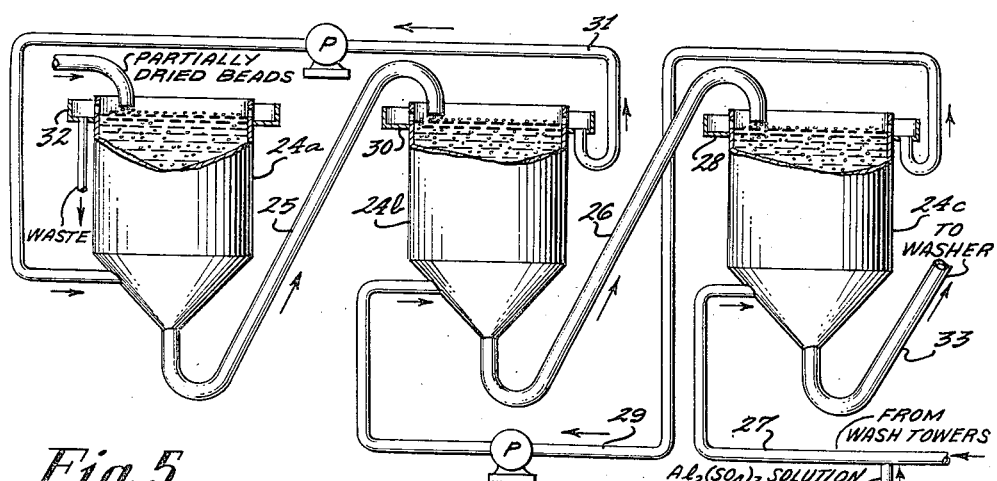

Patented Jan. 5, 1954

2,665,258

UNITED STATES PATENT OFFICE 2,665,258

BEAD FORMING PROCESS

Edward H. Lebeis, Jr., Media, Pa., assignor to Houdry Process Corporation, Wilmington, Del., a corporation of Delaware Application September 29, 1950, Serial No. 187,500

7 Claims. (Cl. 252—448)

The present invention relates to gel bead manufacture and is particularly concerned with the plant scale manufacture of powder-included gel beads. An important application of the invention is in connection with the manufacture of silica-alumina and other silica-metal oxide beads for use as catalyst in hydrocarbon conversion processes.

Among the objects of the invention are to provide an economical manufacturing process of high efficiency for plant scale operation, consistently producing from reactant solutions and starting materials gel beads of desired size uniformity and good physical properties. These objects are furthered by the utilization of the novel sequence of steps hereinafter described. Other objects of the invention will be apparent from the detailed description which follows.

In accordance with the invention aqueous solutions of reactants are admixed in the presence of a finely divided powder to form a powder-containing hydrosol capable of rapidly setting to gel. This hydrosol is discharged as a stream into a water-immiscible liquid wherein as a result of surface tension it is formed into small globular masses which set to hydrogel beads in the immiscible liquid. These beads are classified as to size to provide desired uniformity of the finished product and the rejected size pieces (oversize and undersize) are rapidly dried and finely ground to powder for use as the powder to be incorporated in fresh hydrosol as above described. The selected size beads are then partially dried and these hydrogel beads still containing a large portion of liquid, are wet processed to purify the same, further dried, and finally heat-treated or calcined to stabilize the structure and adjust catalytic activity.

Certain of the individual steps described are carried out in a novel manner, as will hereinafter appear, which contribute to the efficiency of the over-all process and are beneficial in obtaining finished beads of desired quality and uniformity.

Figure 1:
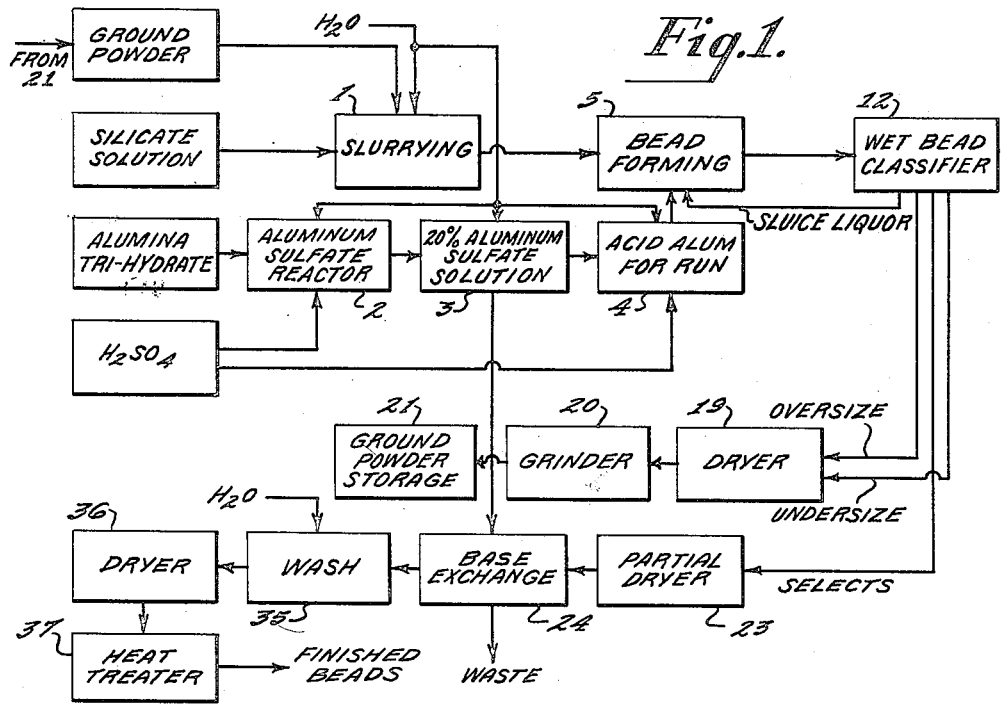
Figure 2:
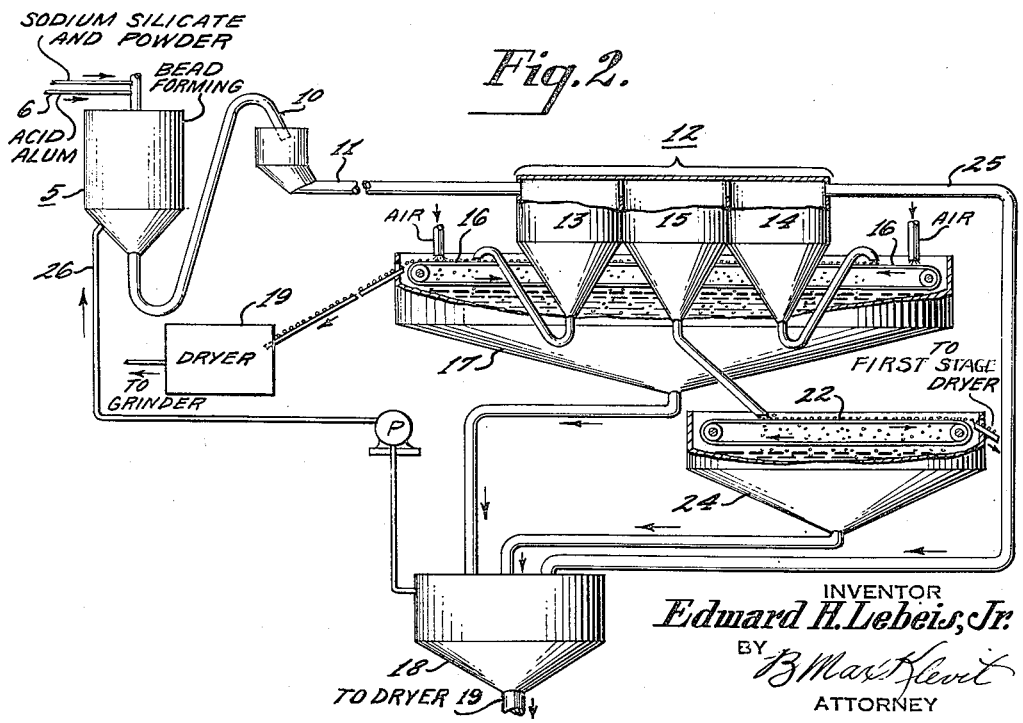

In the accompanying drawings, Figure 1 is a flow sheet of a commercial plant showing generally the sequence of operations; Figure 2 is schematic showing in further detail of the bead-forming and classifying stage; and Figure 3 is an isometric view, largely schematic, of the bead-forming equipment; Figure 4 is an enlarged vertical section of the mixing head shown in Figure 3; Figure 5 is a flow diagram of a preferred countercurrent wet processing system that may be employed in one of the steps shown in Figure 1.

The major steps of the manufacturing process for the preparation of the described gel beads consist of (a) preparation of the solutions, (b) forming the beads, (c) partial drying, (d) purifying, and (e) final drying. The process will be described as applied to the preparation of powder-included silica-alumina beads particularly for catalytic use in the conversion of hydrocarbons. It will be understood, however, that the specific reference is merely illustrative and the invention is not intended to be limited thereto.

As will be seen from the flow sheet in Figure 1, beads are formed by admixture of a slurry of diluted sodium silicate and finely ground powder, with an acid alum solution containing aluminum sulfate and sulfuric acid. The silicate slurry is prepared by adding commercial water glass (such as N-brand silicate) to the suspension formed by agitation of the ground powder in water (1). The second solution is formed from the conversion product of alumina trihydrate with sulfuric acid. Thus, sulfuric acid and alumina trihydrate are reacted to form aluminum sulfate in a batch reaction as indicated at 2 and at the completion of the reaction the aluminum sulfate is diluted with water to selected concentration, and stored as represented at 3. Only part of the prepared aluminum sulfate solution is used in the preparation of the bead-forming solution, the remainder being employed later in the process as will be hereinafter described. The acid alum solution used in bead-forming is made up (4) by mixing the previously prepared aluminum sulfate solution in proper proportions with water and sulfuric acid. Preferably demineralized water is employed in the preparation of both the solutions and the slurry, as well as in later wet processing.

The powder-containing silicate slurry from 1 and the acid alum solution from 4 are continuously pumped to a plurality of bead-forming tanks 5 operating in parallel, each tank receiving carefully metered equal amounts of reactants. Since the operation of each of the tanks is the same, reference will be had to the steps carried out in a single one of these.

Although other forms of mixing and bead-forming devices may be employed, it is preferred to utilize in formation of the beads an apparatus similar to that described in copending application Serial No. 41,983, filed August 2, 1948, now Patent No. 2,588,402. This type of apparatus is schematically shown in Figure 3 and will be described in further detail below. In general, the acid-alum solution and the silicate slurry are very rapidly mixed in a mixing head that revolves about an external axis in a horizontal plane above the surface of a water immiscible liquid in the tank below. The silicate slurry and the acid-alum solution pass through two separate tubes, 6 and 7 respectively, communicating with the mixing head (see Figures 2 and 5) and the reaction product in the form of a silicious hydrosol is ejected horizontally from a nozzle extending rearwardly of the mixing head, as a continuous stream laid down on the oil surface. The hydrosol stream is broken up into small droplets and set into firm hydrogel globules soon after their formation. The oil layer in the tank 8 (Figure 3) floats above an aqueous sodium sulfate solution 9 which operates as a sluice liquor. After the beads fall a short distance through this aqueous solution they are picked up by a moving current of the liquid and carried out of the bead-forming tank 5 through a sluice pipe 10 to a flume 11 (Figure 2) through which they are sluiced to a size classification system 12.

A typical size classification system is schematically illustrated in Figure 2, operating as a hydraulic classifier to sort the wet hydrogel beads into three size ranges. The oversize and undersize beads respectively will fall out of the stream into the separators 13 and 14 while the beads of desired size range will be largely collected in the separator 15. The off size beads from the classifier are discharged onto a drainage belt 16 over which air is blown to remove surface water. The drainage liquid is collected by a pan 17 below the belt, discharging into a settling basin 18. The off size beads from the belt 16 are sent to a drier wherein they are rapidly dried (19), and the dried beads are then ground (20) and sent to ground powder storage (21). This powder is subsequently employed in making up the silicate-powder slurry (1) employed in further bead formation.

The selected size beads from separator 15 are discharged onto a drainage belt 22 which feeds to the first stage drying system 23. The drained liquor is collected in a pan 24 below the belt also discharging into the settling basin 18. The sluice liquor passing beyond the separator 14 is also discharged into the basin 18 by a continuation 25 of the flume 11. Any fines carried over and settling in the basin 18 may be sent to the dryer (19) for ultimate grinding into powder. The sluice liquor collected in basin 18 is pumped through a line 26 to the bottom of tank 5 for further use therein as sluice liquor.

In the drying system 23 the acceptably sized beads from the wet classification step are reduced in moisture content to decrease their bulk and to harden them sufficiently to be handled in moving bed countercurrent base exchange and washing towers. Preferably the drying at this stage is carried to a point short of that at which significant breakage of beads will occur on re-wetting. For most silicious gel beads this initial drying stage may be carried out to provide beads still having a moisture content of about 200% on the unwashed dry basis.

During this preliminary drying stage evaporation takes place from the surface only and at constant rate; that is the rate of moisture removal is substantially unchanged during the entire drying stage. The beads shrink to approximately 40–50% of their original volume and are increased about 30-fold in hardness. This decrease in volume has the advantage of permitting washing of the beads with considerably smaller amounts of relatively expansive demineralized water than would otherwise be required for washing the larger volumes of freshly formed beads. Moreover, important reduction in equipment costs are realized as a result of the reduction in required volumetric capacity of the washing and base exchange equipment. Because of the large increase in hardness the beads can be handled in countercurrent washing towers as a moving bed, thereby greatly simplifying the necessary handling equipment and obtaining improved washing efficiency.

The partially dried beads from 23 are transferred to a base exchange system 24 where zeolitic sodium contained in the beads is replaced by aluminum or alumina. Conventional countercurrent liquid processing towers may be employed wherein the beads are fed to the top of the tower through which they flow by gravity, and the base exchange solution flows upward countercurrent to the beads. In order to provide sufficient treatment in this step without necessitating the use of towers of excessive height, a plurality of shorter towers may be employed in series communicating in such manner that countercurrent flow is maintained. A system of this type is illustrated in Figure 5. Partially dried beads from 23 or from storage are charged into the top of the first of a series of base exchange towers 24a containing aluminum sulfate solution. The beads descend through the solution by gravity and are transported from the base of one drier to the top of the next 24b in the series by a hydraulic lift 25. The beads then pass downwardly through the tower 24b to the bottom thereof and are discharged by a similar hydraulic lift 26 to the top of the succeeding tower 24c, and so forth. In the last of the towers of this series there is introduced aluminum sulfate from 3, diluted with liquid effluent from the washing system, and the effluent from the last base exchange tower and each successive one is discharged respectively into the tower immediately preceding. Thus if three towers are employed in the series for base-exchange, aluminum sulfate solution and effluent from the first washing stage are flowed into the bottom of the tower 24c by a line 27. The overflow from that tower is collected in a basin 28 and pumped therefrom through a line 29 into the bottom of the preceding tower 24b wherein a portion thereof flows upwardly through the lift 26 carrying with it beads from the bottom of tower 24b to the top of tower 24c. In like manner the overflow from tower 24b is collected in a basin 30 and is pumped through a line 31 to the bottom of tower 24a. The overflow from that tower, which is a dilute solution of sodium and aluminum sulfates, is discharged to waste.

From the final stage of the base-exchange system 24c the beads are discharged through a hydraulic lift 33 into suitable tank 35 for water washing to remove most of the aluminum sulfate and sodium sulfate left in the beads. The washing system may be one operating in the same fashion as the previously described base-exchange system except that the processing liquid will be water, preferably demineralized water.

In some instances, particularly when extremely low sodium content of the finished beads is required, it may be desirable to utilize additional chemical purification intermediate the aluminum sulfate treatment and the water washing. For instance, the intermediate purification stage may involve treatment with dilute acids or solutions of acidic salts such as ammonium sulfate. For that purpose an additional countercurrent treating tower of similar construction to those already described may be added to the system, so that the beads from the last aluminum sulfate treating stage are discharged, by hydraulic lift or otherwise, to the top of the ammonium sulfate tower and in turn therefrom into the water washing tower.

The washed beads consisting of purified silica-alumina and containing water are then charged to another drying system 36 where the bulk of the remaining water is removed. In this stage drying is carried out at a "falling rate"; that is, the rate of drying decreases with decreasing water content. During this drying stage the beads are carefully brought to required moisture content and thereafter transferred to heat treatment 37 wherein the dried beads are calcined in air or in controlled mixtures of steam and air to harden the beads, fix their structure, and stabilize or adjust catalytic activity. The heat treated beads are thereafter cooled, screened, and stored or bagged for shipment.

The foregoing description explains generally the sequence of steps employed in the continuous production of beads in practical adaptation of the invention. Various details applicable to certain of these steps will now be discussed. Although the details are given in connection with the preparation of silica alumina beads, the same general procedure is applicable in the preparation of gel beads from reactants forming a hydrosol capable of setting to a gel and particularly to those forming an "all embracing" gel. Thus in the preparation of silica beads the reactants may be those conventionally employed for the purpose of forming silica gel-alkali metal silicate solution and acid. Other silicious plural oxide catalysts and adsorbants may be similarly prepared by coprecipitation of a soluble silicate and a soluble salt of a metal, generally an amphoteric metal, convertible to the desired oxide, including in addition to or instead of aluminum salts, for instance those of zirconium, beryllium and magnesium.

SOLUTION PREPARATION

The respective quantities of aluminum sulfate and sodium silicate admixed for hydrosol formation in step 5 will, of course, depend upon the proportions of silica and alumina desired in the finished bead. To facilitate operation obtaining uniformity in composition, it is advantageous to employ equal volumetric amounts of the reactants in respective concentrations furnishing the required silica/alumina ratio. Since some alumina is also added by base-exchange in step 24, the amount so added enters into the determination of the initial concentration of aluminum sulfate used during hydrosol formation in step 5. In a typical operation, for instance, the proportions of aluminum sulfate and sodium silicate may be selected to furnish a sol containing by weight 93% silica and 7% alumina, and the hydrogel beads formed therefrom may be subsequently adjusted by base-exchange with aluminum sulfate in step 24 to adjust the ratio of silica to alumina in the finished catalyst to 91:9 by weight.

In order to obtain good distribution of the powder in the hydrogel it is best to employ hydrosols having comparatively short setting time, to prevent local settling out of the powder during setting of the gel. The setting time of a hydrosol is dependent upon such factors as temperature, pH and concentration of the reactants. Silica-alumina hydrosols at a pH of about 5 to 9, setting in about 0.2 to 0.5 second, are readily obtained without temperature elevation at product concentrations above about 80 grams of $SiO_2$ and $Al_2O_3$ per liter of mixed reacting solution (not considering added powder). A typical composition suitable for use in accordance with the present invention for the preparation of high porosity powder-including beads is one having a pH of about 8.5 and a product concentration of $SiO_2$—$Al_2O_3$ of 100 grams per liter (without powder) which will set in about 0.25 second. Such a hydrosol may be prepared by mixing equal volumes of silicate slurry and acid-alum solution of the following compositions:

*Parts by weight*

| Silicate slurry | | Acid-alum solution | |
|---|---|---|---|
| Powder | 177.6 | $Al_2(SO_4)_3$ | 93.5 |
| $SiO_2$ | 371.2 | $H_2SO_4$ | 70.0 |
| $Na_2O$ | 115.5 | $H_2O$ | 1,952.5 |
| $H_2O$ | 1,799 | | |

Although as set out in previous U. S. Patent No. 2,487,065, various types of powders may be employed for improving the porosity and physical characteristics of gel beads, it is preferred in accordance with the present invention to employ for this purpose powder derived from off-size beads produced in the process, thus contributing to the economics and efficiency of the process as a whole. For the production of silica-alumina beads to be employed as hydrocarbon cracking catalysts the powder should be ground to an average size of less than about 25 microns and preferably to about 5 to 15 micron size. Thus, in a preferred embodiment utilizing powder of 10 micron average size, the particles may lie predominantly in the range of about 7 to 13 microns.

The amount of powder employed will depend largely upon the properties required in the finished beads. For the production of beads of high porosity and acceptable physical strength, useful in fixed bed and moving bed catalytic conversion systems, the powder should be present in at least 20% and generally 25 to 30% by weight of the $SiO_2$—$Al_2O_3$ content of the remainder of the gel. Beads of this powder content display regeneration characteristics resembling typical commercial acid-activated clay pellets; ordinary beads without powder regenerate by combustion of coke at a significantly lower rate. These high porosity beads have a desirable distribution of different size pores a large part of which are of large size (over 2000 Å. diameter), as up to 25% or more of the pore volume.

In the production of beads required to withstand frequent and severe impact at low attrition rates, it is preferred to employ smaller amounts of powder, as not in excess of about 17 to 18% by weight of the total dry bead weight (including powder). Such beads are still more porous than ordinary beads free from powder and have regeneration characteristics superior to such ordinary beads.

The formation of the aluminum sulfate solution by reaction of alumina trihydrate with sulfuric acid furnishes an inexpensive and convenient method for the preparation of acid alum solution of desired composition. Thus, the aluminum sulfate reaction product formed in step 2 may be admixed with water to provide a 20 per cent aqueous solution of $Al_2(SO_4)_3$. This solution may be conveniently employed in the base-exchange step (24), and part of it may be adjusted by addition of water and acid (4) to provide a solution of required concentration and pH for hydrosol formation (5).

Bead forming

Referring more particularly to Figure 3, the adjusted acid alum solution from 4 is admitted to the mixing head assembly through a line 36 entering through a bore in the central rotating shaft 37 communicating with an attached conduit 6 conducting that solution to a mixing chamber within the mixing head 38. The silicate slurry is admitted through a line 39 entering a bore provided in the shaft 37 and passing outwardly therefrom through a corresponding conduit 7 also communicating with the mixing chamber within the mixing head 38. The reactant conducting conduits 6 and 7 are positively fixed to the rotating shaft 37 so that rotation of the shaft causes positive movement of these conduits and of the mixing head 38 attached thereto, through a circular path approximate the periphery of the wall of tank 5.

The mixing head 38 is preferably made in streamline shape to reduce windage. The head is provided with a horizontal longitudinal bore into which a plug 40 is fitted at the forward end providing channels 40a and 40b for passage of reactants admitted to the head through conduits 6 and 7 respectively. The other end of the bore in the head is fitted with a rearwardly extending nozzle 41 providing a mixing chamber into which the channels 40a and 40b discharge for rapid and intimate admixture. The reaction product is ejected from the tip of the nozzle 41 and falls onto the surface of the immiscible liquid, the nozzle being located just above the level of the water-immiscible liquid in the tank 5. The speed of rotation of the shaft 37 and thereby the linear velocity of the head 38 is controlled in correlation with the flow rate of the liquid reaction product from the nozzle 41, so that the rate of movement of the nozzle is approximately equal to the rate at which hydrosol formed in the mixing head 38 is discharged therefrom. Smooth and efficient operation has been obtained with the head travelling at linear velocities of about 25 to 35 feet per second. The hydrosol is discharged in a direction opposite to that of the direction of movement of the mixing head so that the discharge stream has substantially no horizontal velocity component. The stream of hydrosol discharged from the nozzle 41 is thus continuously laid down smoothly on the surface of the oil or other water-immiscible liquid. Preferably, the immiscible liquid in the tank 5 is of lower specific gravity than the hydrosol so that the hydrosol settles through the body of oil, and as a result of the interfacial tension between the oil and the hydrosol, the latter is broken up into droplets which continue to settle in the body of oil. The oil depth provided should be sufficient to permit setting of the hydrosol to firm hydrogel therein. The set hydrogel globules thus formed then continue to settle in the oil and pass through the interface into the aqueous sluice liquid 9 in the bottom of the tank. Suitable setting liquids having a lower specific gravity than the hydrosol include petroleum naphthas, kerosene, hydrocarbon oils, halogenated hydrocarbons, or other liquids or mixtures giving desired density and viscosity.

The sluice liquid employed in 9 may be any aqueous solution compatible with the hydrogel and one preferably having the same osmotic pressure as the hydrogel. A 5 percent solution of sodium sulfate, for instance, could be used for this purpose.

CLASSIFYING

In a typical operation the wet hydrogel beads produced in 5 may lie in a size range furnishing finished beads which in calcined state will vary in size largely from approximately 2 to 5 mm. in diameter. By the removal of offsize beads, which will ordinarily be less than about 20% of the total production, the final size variation may be readily narrowed to a range of about 3 to 4.5 mm.

The particular means for classifying the wet beads as to size shown in Figure 2 is merely illustrative; other conventional size classifying devices may be employed such as simple wet screening through a grizzly or other device that will not cause excessive breakage of the beads.

By effecting classifying at the described stage in the process rather than at a later stage, the load is advantageously reduced on the subsequent equipment in which the more careful drying and wet processing is effected.

DRYING

The hardness of gel beads will be governed, among other factors, by the rate and conditions under which the same are dried. The off-size beads from wet classification are rapidly dried in step 19 in a simple and inexpensive drier and under conditions obtaining a comparatively weak gel structure, such that the gel is more readily ground to desired powder size in the subsequent grinding step 20. An ordinary rotary drum drier with countercurrent flow of hot gas going up to temperatures in the order of 300° F. or more, can be used in this step.

The beads of acceptable size, however, are dried under more carefully controlled conditions to obtain ultimately beads of desired hardness. These beads are preferably dried in several stages. As already explained, in the initial drying stage for the selected beads, they are only partially dried to provide a product of reduced volume for further wet processing. This procedure of partially drying the beads before base-exchange and washing, simplifies handling and obtains important savings in operating and investment costs. Although during such partial drying the rate and conditions encountered do not have any pronounced effect on the pore volume and strength of the beads (which becomes critical only during the later drying stage), it is nevertheless desirable even during this partial drying stage to maintain as far as possible a substantially uniform drying rate, particularly from the standpoint that any aging of the beads occurring during such partial drying will affect all of the beads substantially uniformly. The extent of aging otherwise provided and that taking place incident to initial evaporation of moisture from the wet hydrogel, fixes the final density of the heat-treated product; the more extensive that aging the lower the density. The extent of aging taking place is a function of time, temperature and pH; at higher pH and/or higher temperature aging takes place more rapidly. Accordingly, to maintain desired control of aging during initial partial drying of the wet hydrogel these factors must be regulated. For a gel of predetermined pH, aging can be controlled by suitable selection of wet bulb temperature and time, or the spread maintained between the wet and dry bulb temperatures. For gel beads of the composition under consideration, partial drying of the hydrogel to the described moisture content, is preferably carried out at a wet bulb temperature of about 100 to 180° F. and a dry bulb temperature of about 20° to 80° higher.

During this preliminary partial drying stage, the wet beads may be transported on a continuous perforate belt passing through a tunnel dryer; hot gas at the required temperature and humidity being continuously blown through the belt. To obtain better uniformity of treatment it is advantageous to provide means for periodically changing the position of the beads on the belt; desirably also, the direction of gas flow through the layer of beads on the belt should be alternately reversed. A convenient method of changing the position of the beads during drying is by the provision of a plurality of short belts in series discharging the beads successively from one belt to the next, and thereby altering the respective positions occupied by the beads on the belts.

During the subsequent drying stage in step 36, the rate of moisture removal must be carefully controlled, to obtain beads of desired strength and porosity. It has been found that at a given drying rate large pore formation is inversely proportional to the wet bulb temperature of the air, and at constant wet bulb temperature large pore formation is directly proportional to the drying rate. Increase in pore volume, however, may be at the expense of reduced crushing hardness. It was found by extensive investigation that best over-all results were obtained at comparatively high wet bulb temperatures. Beads of desired large pore volume and good physical strength are obtained by drying in superheated steam. In general, satisfactory results are obtained when drying at a wet bulb temperature of at least 180° F. and a corresponding dry bulb temperature of about 20 to 60° higher. Beads thus obtained, after calcination in air at 1400° F., had a large pore volume (above 2000 angstroms) of up to 0.25 cc./gm. and acceptable hardness resisting crushing.

CALCINING

The dried beads are finally subjected to heat treatment at elevated temperatures, which for catalyst preparations generally lie in the range of about 800° to about 1600° F. This heat treatment effects further hardening of the beads and stabilization of structure and activity. During such heat treatment the catalytic activity of the beads may be adjusted to desired level by the addition or use of steam in controlled quantity as more particularly described by Bates in U. S. Patent No. 2,375,757.

Obviously many modifications and variations of the invention as hereinbefore set forth may be made without departing from the spirit and scope thereof and therefore only such limitations should be imposed as are indicated in the appended claims.

I claim as my invention:

1. The method of preparing inorganic gel beads which comprises admixing powdered gel derived from the process with reactants producing a gelable hydrosol, discharging the thus produced powder-containing hydrosol into a body of water-immiscible liquid wherein as a result of interfacial tension the hydrosol is divided into globules which set to hydrogel in said immiscible liquid, classifying the hydrogel globules thus produced to separate those of selected size range and rejecting offsize globules, drying the offsize globules at a rate sufficiently rapid to form a frangible easily comminuted structure and grinding the same to powder of desired size range to provide the aforesaid powdered gel initially admixed with reactants, recycling said powder for admixing with said gelable hydrosol-producing reactants, partially drying said globules of selected size range to reduce the volume thereof and to a residual moisture content permitting rewetting without substantial breakage, treating the partially dried globules with aqueous liquid to purify the same, and carefully drying the purified globules under conditions including controlled humidity to obtain beads of good physical strength.

2. The method according to claim 1 wherein said reactants producing gelable hydrosol comprise a water-soluble silicate and a water soluble salt of an amphoteric metal, said reactants being admixed in concentrations forming a hydrosol setting to an all-embracing hydrogel.

3. The method according to claim 2 wherein said reactants comprise alkali metal silicate and an acidified solution of an aluminum salt.

4. The method according to claim 1 wherein said gelable hydrosol is produced by admixing a slurry of sodium silicate and said powdered gel with an acid solution of aluminum sulfate.

5. The method according to claim 1 wherein the selected size range is such that the beads are of a size such that the final beads obtained therefrom on drying and calcination are of about 3 to 4.5 millimeters in diameter.

6. The method according to claim 1 wherein said offsize beads are ground to an average size of less than about 25 microns.

7. The method of preparing silica-alumina bead catalyst which comprises admixing an aqueous slurry of sodium silicate with an acid solution of an aluminum salt in concentrations providing a hydrosol capable of rapidly setting to an all embracing gel, said aqueous slurry including powdered silica alumina gel derived from the process as hereinafter defined, discharging said hydrosol into a water-immiscible liquid wherein said hydrosol is formed into globules and said globules are set to gel, removing from the thus produced gel globules those of undesired size, carefully drying the remaining globules of desired size under selected conditions controlled to obtain beads of good physical strength, drying the rejected globules of undesired size at a rate sufficiently rapid to form a frangible easily comminuted structure and grinding the same to provide powdered silica-alumina gel for inclusion in subsequent silicate slurry used in hydrosol formation, and recycling the powdered gel for admixture with said sodium silicate to form said aqueous slurry.

EDWARD H. LEBEIS, JR.

References Cited in the file of this patent

UNITED STATES PATENTS

| Number | Name | Date |
|---|---|---|
| 2,147,985 | McKinney | Feb. 21, 1938 |
| 2,384,944 | Marisic | Sept. 18, 1945 |
| 2,433,869 | Shabeker | Jan. 6, 1948 |
| 2,453,084 | Brown | Nov. 2, 1948 |
| 2,487,065 | Milliken | Nov. 8, 1949 |
| 2,528,767 | Marisic | Nov. 7, 1950 |
| 2,588,402 | Milliken | Mar. 11, 1952 |